United States Patent
Koenig et al.

(10) Patent No.: US 9,729,018 B2
(45) Date of Patent: Aug. 8, 2017

(54) INTEGRAL OPTIMIZED FLOW CHANNELS FOR FLUID-COOLED MOTORS AND GENERATORS

(71) Applicant: HAMILTON SUNDSTRAND CORPORATION, Charlotte, NC (US)

(72) Inventors: Andreas C. Koenig, Machesney Park, IL (US); Joseph K. Coldwate, Rosco, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 370 days.

(21) Appl. No.: 14/549,873

(22) Filed: Nov. 21, 2014

(65) Prior Publication Data
US 2016/0149448 A1    May 26, 2016

(51) Int. Cl.
*H02K 9/02* (2006.01)
*H02K 1/20* (2006.01)

(52) U.S. Cl.
CPC ............... *H02K 1/20* (2013.01); *H02K 9/02* (2013.01)

(58) Field of Classification Search
CPC .. H02K 9/00; H02K 9/02; H02K 1/20; H02K 5/20; H02K 7/14; B60H 1/32; B60H 1/3223; F04B 35/00; F04B 35/04; F04B 39/02; F04B 39/0246; F04C 23/00; F04C 23/008; F04C 29/04; F04C 29/045
USPC ..................................... 310/52, 58–59, 60 A
See application file for complete search history.

(56) References Cited

U.S. PATENT DOCUMENTS

| | | | | |
|---|---|---|---|---|
| 2,818,515 A * | 12/1957 | Dolenc | ................... | H02K 1/185 310/216.014 |
| 4,406,959 A * | 9/1983 | Harano | ..................... | H02K 9/20 165/104.25 |
| 4,912,350 A * | 3/1990 | Parshall | ................... | H02K 1/16 310/216.013 |
| 5,747,900 A * | 5/1998 | Nakamura | ............... | H02K 9/16 310/58 |
| 6,234,768 B1 * | 5/2001 | Harakawa | ............ | B60H 1/3223 417/366 |

(Continued)

FOREIGN PATENT DOCUMENTS

| | | |
|---|---|---|
| DE | 3334501 | 3/1984 |
| DE | 19823586 | 11/1999 |

(Continued)

OTHER PUBLICATIONS

Extended European Search Report dated Sep. 9, 2016 in European Application No. 15190880.3.

*Primary Examiner* — Tran Nguyen
(74) *Attorney, Agent, or Firm* — Snell & Wilmer, L.L.P.

(57) ABSTRACT

An electric machine is provided. The electric machine may comprise an inlet and a stator fluidly coupled to the inlet. The stator may comprise a first cooling channel formed in the stator with a first cross-sectional area. A second cooling channel may be formed in the stator and have a second cross-sectional area. The first cross-sectional area may be less than the second cross-sectional area. The electric machine may also include an outlet fluidly coupled to the stator. A stator assembly is also provided. The stator assembly may include a first channel with a first cross-sectional area and a second channel with a second cross-sectional area. The second cross-sectional area may be less than the first cross-sectional area.

15 Claims, 4 Drawing Sheets

(56) References Cited

U.S. PATENT DOCUMENTS

| | | | | |
|---|---|---|---|---|
| 6,657,332 B2 * | 12/2003 | Balas | ............... | F02C 7/08 |
| | | | | 310/58 |
| 6,680,550 B2 * | 1/2004 | Matsunaga | ............. | H02K 1/20 |
| | | | | 310/52 |
| 7,633,194 B2 * | 12/2009 | Dawsey | ............... | H02K 1/20 |
| | | | | 310/57 |
| 8,258,670 B2 * | 9/2012 | Sakuma | ............... | H02K 1/185 |
| | | | | 310/216.118 |
| 2005/0067905 A1 * | 3/2005 | Maney | ............... | H02K 1/20 |
| | | | | 310/58 |
| 2006/0284511 A1 | 12/2006 | Evon et al. | | |
| 2007/0013241 A1 * | 1/2007 | Schiferl | ............... | H02K 1/32 |
| | | | | 310/54 |
| 2009/0121564 A1 * | 5/2009 | Pal | ............... | H02K 1/20 |
| | | | | 310/58 |

FOREIGN PATENT DOCUMENTS

| | | |
|---|---|---|
| EP | 2658089 | 10/2013 |
| FR | 2975239 | 11/2012 |

* cited by examiner

INTEGRAL OPTIMIZED FLOW CHANNELS FOR FLUID-COOLED MOTORS AND GENERATORS

FIELD OF INVENTION

The present disclosure relates to air-cooled electric machines, and, more specifically, to stator laminations having optimized air flow channels.

BACKGROUND

An electric generator or motor typically comprises a field magnet comprising a permanent magnet or electromagnet and an armature. For example, an electric motor wherein the stator functions as an armature may have copper wound around teeth on the stator. The windings may heat up during operation as current moves within the windings. The windings may be cooled to offset the heat generated by the current in the windings. In air-cooled electric motors, for example, channels bounded by fins may direct air over the stator to cool the windings. Typically, a single air intake and outlet provide the air flow into the channels to cool the windings. However, electric devices frequently have uneven cooling in the various channels. The channels closest to the inlet or outlet may have greater air flow (and thus greater cooling) than the channels farthest from the inlet or outlet.

SUMMARY

An electric machine is provided. The electric machine may comprise an inlet and a stator fluidly coupled to the inlet. The stator may comprise a first cooling channel formed in the stator with a first cross-sectional area. A second cooling channel may be formed in the stator and have a second cross-sectional area. The first cross-sectional area may be less than the second cross-sectional area. The electric machine may also include an outlet fluidly coupled to the stator.

In various embodiments, the inlet may be closer to the first cooling channel than the second cooling channel. A third cooling channel may be formed in the stator with the third cooling channel farther from the inlet than the second cooling channel. The third cooling channel may also comprise a cross-sectional area greater than the second cooling channel. The stator may comprise plurality of stator laminations affixed together to define the first cooling channel and the second cooling channel. The plurality of stator laminations may each have a plurality of channels aligned to form the first cooling channel and the second cooling channel. The outlet may be closer to the first cooling channel than the second cooling channel. The stator may include a first lamination with uniform channels and a second lamination with optimized channels and affixed to the first lamination. The optimized channels may be configured to meter airflow through the uniform channels. The first cooling channel and the second cooling channel may be configured to carry similar air flow or to provide similar heat transfer.

A stator assembly is also provided. The stator assembly may include a first channel with a first cross-sectional area and a second channel with a second cross-sectional area. The second cross-sectional area may be less than the first cross-sectional area.

In various embodiments, the stator assembly may further comprise a third channel with a third cross-sectional area less than the second cross-sectional area. The first channel, the second channel, and the third channel may be configured to carry similar air flow. The first cross-sectional area, the second cross-sectional area, and the third cross-sectional area may be configured to optimize air flow. A plurality of stator laminations may be affixed together to define the first channel and the second channel.

In various embodiments, the stator assembly may also comprise a first lamination with uniform channels and a second lamination with optimized channels. The second lamination may be affixed to the first lamination, and the optimized channels may include the first channel and the second channel. The first channel and the second channel may be configured to meter air flow through the uniform channels.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
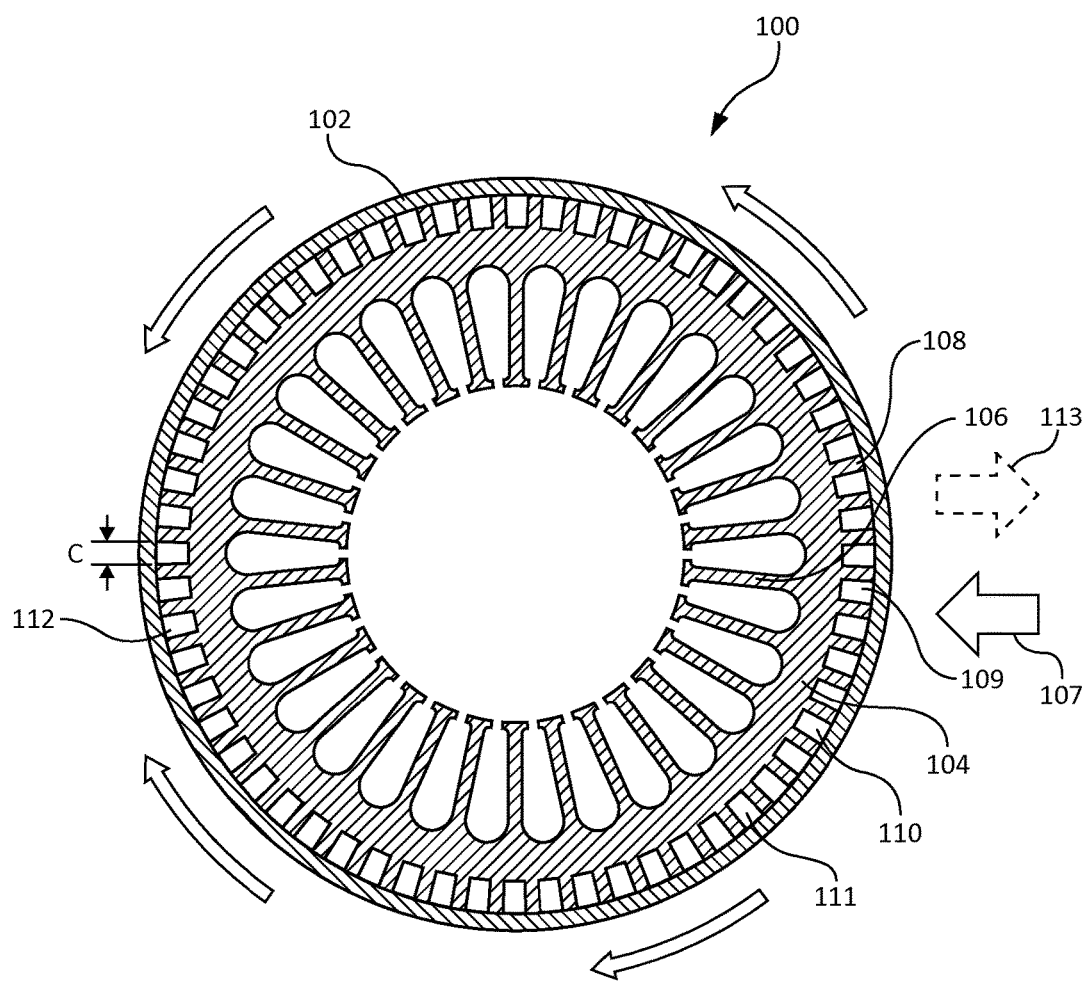
FIG. 1 illustrates a stator assembly with a stator lamination for an air-cooled electric motor with uniform cooling channels, in accordance with various embodiments.

With reference to FIG. 1, a stator lamination 104 for an air-cooled electric motor is shown having uniform cooling channels, in accordance with various embodiments. Stator assembly 100 may comprise an outer housing 102. Stator lamination 104 may be inside of outer housing 102 with arms 106 extending inward. Stator lamination 104 may be a circular shape with arms 106 protruding towards the center of the circular shape. Multiple stator laminations 104 may be glued, bonded, or welded together to form a stator. Copper may be wound around arms 106 of stator lamination 104 to generate a magnetic field to magnetically interact with a rotor. When assembled, an electric motor would include a rotor radially inward from arms 106 of stator lamination 104.

Stator lamination 104 may comprise cooling channels 109-112. Cooling channels 109-112 may be defined by fins 108 extending outward from a perimeter of stator lamination 104. Cooling channels 109-112 may have a uniform cross-sectional area and total volume. Cooling channels 109-112 with a uniform size may provide uneven cooling for stator lamination 104 and the winding. The different crosshatching in cooling channels 109-112 represents varying air flow present in the cooling channels absent metering. Cooling channels 109 may be the closest of cooling channels 109-112 to the inlet air 107 and air outlet 113 (described further in FIG. 4 below). Thus, cooling channels 109 may have the most air flow of cooling channels 109-112. Cooling channels 110 may be near to the inlet air 107, but not as near to the inlet as cooling channels 109. Thus, cooling channels 110 carry less air flow than cooling channels 109. Cooling channels 111 are still further from the air inlet than cooling channels 110. Thus, cooling channels 111 carry less air flow than cooling channels 109 and 110. Cooling channels 112 are the farthest away from the air inlet and carry the least air flow of cooling channels 110-112. The air flow through cooling channels 109-112 may vary since cooling channels 109-112 have the same size but cooling channels 109 are the closest to the inlet. Closer channels to the air inlet are subjected to greater air pressure and air flow than distant channels. In that regard, the air from inlet air 107 flowing into channels 109 may be greater than the air flow entering cooling channels 110, cooling channels 111, and cooling channels 112 (as represented graphically by the decreasing arrow size).

Figure 2:
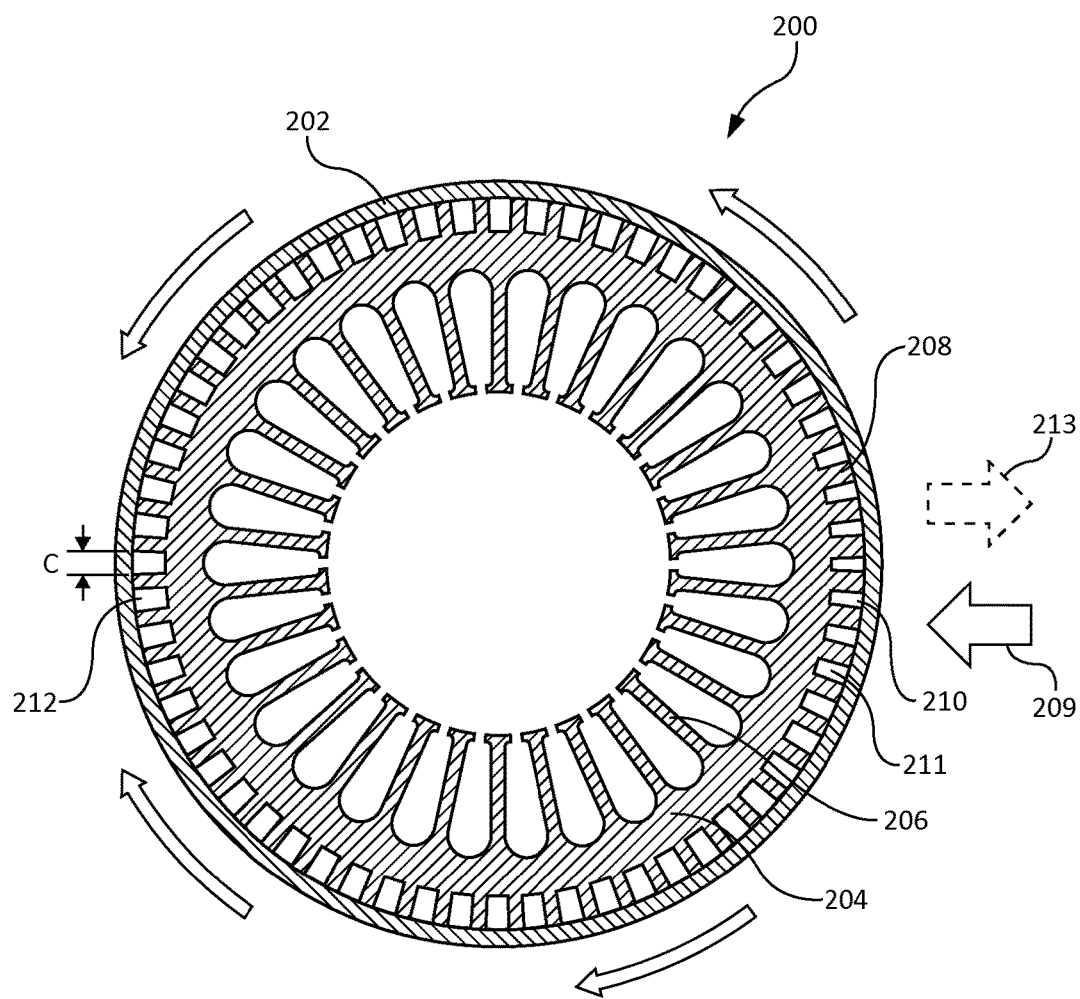
FIG. 2 illustrates a stator assembly with a stator lamination for an air-cooled electric motor with optimized cooling channels, in accordance with various embodiments.

In various embodiments, and with reference to FIG. 2, stator lamination 204 for an air-cooled electric motor with narrow optimized channels 210, intermediate optimized channels 211, and wide optimized channels 212 (collectively, optimized cooling channels 210-212) is shown, in accordance with various embodiments. Stator assembly 200 may comprise an outer housing 202. Stator lamination 204 may comprise teeth 206 extending radially inward from an inner diameter of a circular shape. Teeth 206 may support copper windings to produce a magnetic field when stator lamination 204 is integrated into an electric motor or generator. Stator lamination 204 may also include fins 208 defining optimized channels of stator lamination 204. Narrow optimized channels 210, intermediate optimized channels 211, and wide optimized channels 212 of stator lamination 204 may vary in size. Narrow optimized channels 210 may have a smaller cross sectional area than intermediate optimized channels 211 or wide optimized channels 212. Intermediate optimized channels 211 may also have a smaller cross-sectional area than wide optimized channels 212. In various embodiments, narrow optimized channels 210, intermediate optimized channels 211, and wide optimized channels 212 may have the same radial length (i.e., depth) but a different circumferential length c (i.e., width). The circumferential length c of wide optimized channels 212 may be greater than the circumferential length c of intermediate optimized channels 211 or of narrow optimized channels 210. In that regard, wide optimized channels 212 provide less resistance to air flow than intermediate optimized channels 211 or narrow optimized channels 210.

In various embodiments, the cross-sectional areas of narrow optimized channels 210 may vary, the cross-sectional areas intermediate optimized channels 211 may vary, and the cross-sectional areas of wide optimized channels 212 may vary. Put another way, each optimized cooling channel 210-212 may have a different cross sectional area. Narrow optimized channels 210 may be closest to inlet air 209 and air outlet 213 (as further described in FIG. 4 below). Narrow optimized channels also provide greater resistance to air flow than intermediate optimized channels 211 or wide optimized channels 212. In that regard, the narrow nature of narrow optimized channels 210 tends to reduce the amount of airflow through narrow optimized channels 210 relative to cooling channels 109 from FIG. 1 when used in a similar application (with both narrow optimized channels 210 and cooling channels 109 being near an air inlet). By increasing the resistance to air flow through narrow optimized channels 210, air from an air inlet proximate narrow optimized channels may be forced into intermediate optimized channels 211 or wide optimized channels 212 further away from the air inlet.

In various embodiments, the cross sectional area, circumferential length, and radial length of each narrow optimized channel 210, intermediate optimized channel 211, and wide optimized channel 212 may be tuned to provide similar air flow (i.e., mass of air per unit time, for example, as measured in the units pounds per minute) through each of optimized cooling channels 210-212. In that regard, stator lamination 204 with optimized channels may provide more uniform cooling. Air flow from inlet 107 may be distributed into narrow optimized channels 210, intermediate optimized channels 211, and wide optimized channels 212 so that the volume flowing into each channel is similar (as shown by uniform arrows distributing inlet air 209). Uniform cooling may reduce the temperature gradient across stator lamination 204 compared to the temperature gradient across stator lamination 104 with uniform cooling channels.

Figure 3:
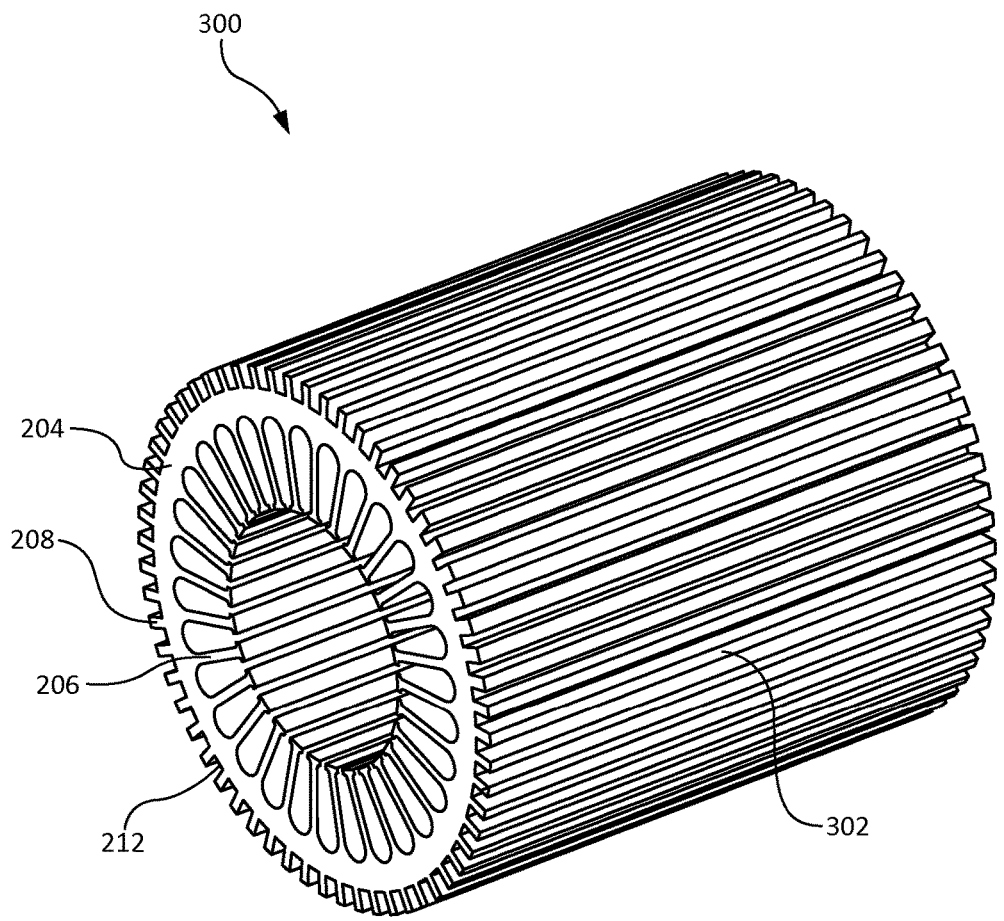
FIG. 3 illustrates a perspective view of a stator assembly comprising multiple stator laminations affixed together, in accordance with various embodiments.

With reference to FIG. 3 a stator assembly 300, also referred to herein as a stator, comprising multiple stator laminations 204 is shown, in accordance with various embodiments. Stator assembly 300 may be cylindrical with fins 302 extending the length of stator assembly 300 in a direction orthogonal to the face of stator lamination 204. Fins 302 may define channels. In various embodiments, stator assembly 300 may comprise multiple stator laminations 104 and one or more stator laminations 204 affixed together.

In various embodiments, stator lamination 204 may be an iron based magnetic steel. Stator laminations may be formed by starting with thin (e.g., 0.006 inches to 0.02 inches or 0.15 mm to 0.5 mm) sheets of a desired magnetic material. A stamp may be used to punch out a stator lamination 204 or stator lamination 104. Multiple stator laminations 204 and/or stator laminations 104 may be aligned and affixed to one another to form a stator. Multiple stator laminations 204 and/or stator laminations 104 may be glued, bonded, welded, or otherwise joined together to form a stator assembly 300. The stator assembly may be assembled with narrow optimized channels 210 of a first stator lamination aligned with narrow optimized channels 210 of a second stator lamination having the same or a similar size. Intermediate optimized channels 211 of a first stator lamination aligned with intermediate optimized channels 211 of a second stator lamination having the same or a similar size. Wide optimized channels 212 of a first stator lamination aligned with wide optimized channels 212 of a second stator lamination having the same or a similar size. Thus, the stator may have channels of varying cross sectional area with a substantially constant circumferential length over the length of stator assembly 300.

In various embodiments, stator assembly may comprise multiple stator laminations 104 affixed together to form substantially uniform channels with one or more stator lamination 204 affixed to stator laminations 104. Stator laminations 204 have optimized channels to meter air flow through the uniform channels of stator laminations 104. In that regard, the channels of each adjacent stator lamination may not align and channels of stator assembly 300 may be non-uniform in cross-sectional area. The section of a channel with the smallest cross-sectional area may serve to limit air flow through the channel. The arms 106 of stator laminations 104 and teeth 206 of stator lamination 204 may be aligned in embodiments where different stator laminations are combined to form the stator assembly.

Figure 4:
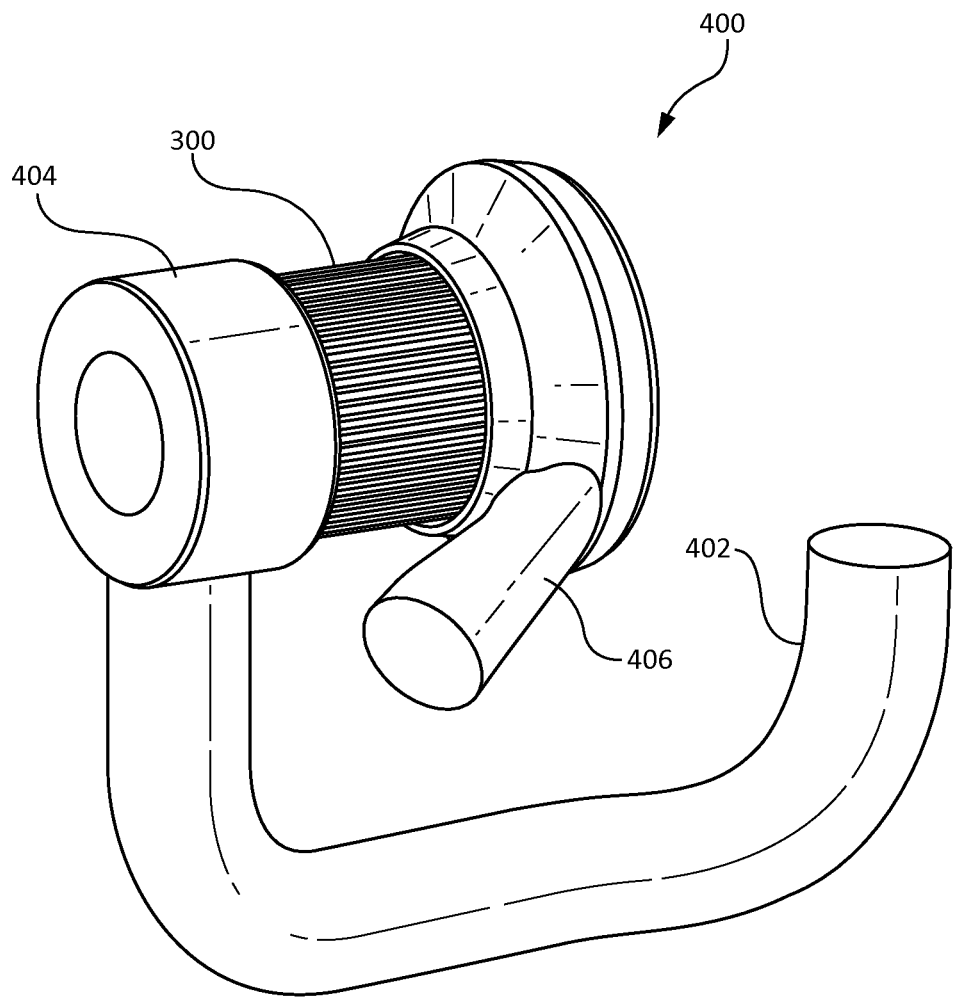
FIG. 4 illustrates a perspective view of an assembled electric machine with an air inlet and air outlet to deliver cooling air to a stator assembly.

FIG. 4 illustrates a perspective view of an electric motor 400 (i.e., a generator) with an air inlet 402 and air outlet 406 in fluid communication with stator assembly 300 to deliver cooling air to the stator assembly. With reference to FIGS. 3 and 4, air inlet 402 may be nearest to one side of stator lamination 204. Narrow optimized channels 210 of stator lamination 204 may be closest to air inlet 402. Wide optimized channels 212 of stator lamination 204 may be farthest of the optimized channels from the air inlet 402. Since the narrow optimized channels 210 are closest to air inlet 402, and are more resistant than other optimized channels to air flow, some of air entering from air inlet 402 may be forced around intake housing 404 to intermediate optimized channels 211 and wide optimized channels 212. In that regard, stator laminations 204 with optimized channels of varying cross-sectional areas tends to balance cooling airflow around the circumference of stator assembly 300. The air flowing out stator assembly 300 may exit electric motor 400 through air outlet 406. Air outlet 406 may be rotated relative to stator assembly 300 and air inlet 402 to further optimize air flow through cooling channels of stator assembly 300.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electric motor, comprising:
    a stator comprising,
        a first cooling channel formed in the stator and comprising a first cross-sectional area, and
        a second cooling channel formed in the stator and comprising a second cross-sectional area, wherein the first cross-sectional area is less than the second cross-section area; and
    an inlet disposed closer to the first cooling channel than the second cooling channel, wherein the first cooling channel and the second cooling channel are configured to balance an air flow from the inlet around a circumference of the stator.

2. The electric i motor of claim 1, wherein the first cross-sectional area of the first cooling channel is configured to force the air flow from the inlet into the second cooling channel.

3. The electric motor of claim 2, further comprising a third cooling channel formed in the stator with the third cooling channel further from the inlet than the second cooling channel, wherein the third cooling channel comprises a cross-sectional area greater than the second cooing channel.

4. The electric motor of claim 1, wherein the stator comprises plurality of stator laminations affixed together to define the first cooling channel and the second cooling channel.

5. The electric motor of claim 4, wherein the plurality of stator laminations each have a plurality of channels aligned to form the first cooling channel and the second cooling channel.

6. The electric motor of claim 1, further comprising an outlet closer to the first cooling channel than the second cooling channel.

7. The electric motor of claim 1, wherein the stator comprises:
   a first lamination with uniform channels; and
   a second lamination with optimized channels and affixed to the first lamination, wherein the optimized channels are configured to meter airflow through the uniform channels.

8. The electric motor of claim 1, wherein a first radial length of the first cooling channel is equal to a second radial length of the second cooling channel.

9. A stator assembly, comprising:
   a first channel with a first cross-sectional area; and
   a second channel with a second cross-sectional area, wherein the second cross-sectional area is less than the first cross-sectional area and wherein the second cooling channel is configured to be closer to an inlet than the first cooling channel and wherein the first cooling channel and the second cooling channel are configured to balance an air flow from the inlet around a circumference of the stator assembly.

10. The stator assembly of claim 9, further comprising a third channel with a third cross-sectional area, wherein the third cross-sectional area is less than the second cross-sectional area.

11. The stator assembly of claim 10, wherein the first channel, the second channel, and the third channel are configured to balance an air flow around a circumference of the stator assembly.

12. The stator assembly of claim 10, wherein the first cross-sectional area, the second cross-sectional area, and the third cross-sectional area are configured to optimize air flow.

13. The stator assembly of claim 9, further comprising a plurality of stator laminations affixed together to define the first channel and the second channel.

14. The stator assembly of claim 9, further comprising:
    a first lamination comprising uniform channels; and
    a second lamination comprising optimized channels and affixed to the first lamination, wherein the optimized channels include the first channel and the second channel.

15. The stator assembly of claim 14, wherein the first channel and the second channel are configured to meter air flow through the uniform channels.

* * * * *